Dec. 15, 1959 B. J. WARMAN 2,917,586

KEYSENDERS OF THE KIND USED IN TELEPHONE SYSTEMS

Filed Feb. 26, 1957 3 Sheets-Sheet 1

Dec. 15, 1959 B. J. WARMAN 2,917,586

KEYSENDERS OF THE KIND USED IN TELEPHONE SYSTEMS

Filed Feb. 26, 1957 3 Sheets-Sheet 2

Dec. 15, 1959 B. J. WARMAN 2,917,586

KEYSENDERS OF THE KIND USED IN TELEPHONE SYSTEMS

Filed Feb. 26, 1957 3 Sheets-Sheet 3

United States Patent Office 2,917,586

Patented Dec. 15, 1959

2,917,586

KEYSENDERS OF THE KIND USED IN TELEPHONE SYSTEMS

Bloomfield James Warman, Charlton, London, England, assignor, by mesne assignments, to Siemens Edison Swan Limited, London, England, a British company Application February 26, 1957, Serial No. 642,573

Claims priority, application Great Britain February 28, 1956

5 Claims. (Cl. 179—18)

Figure 1:
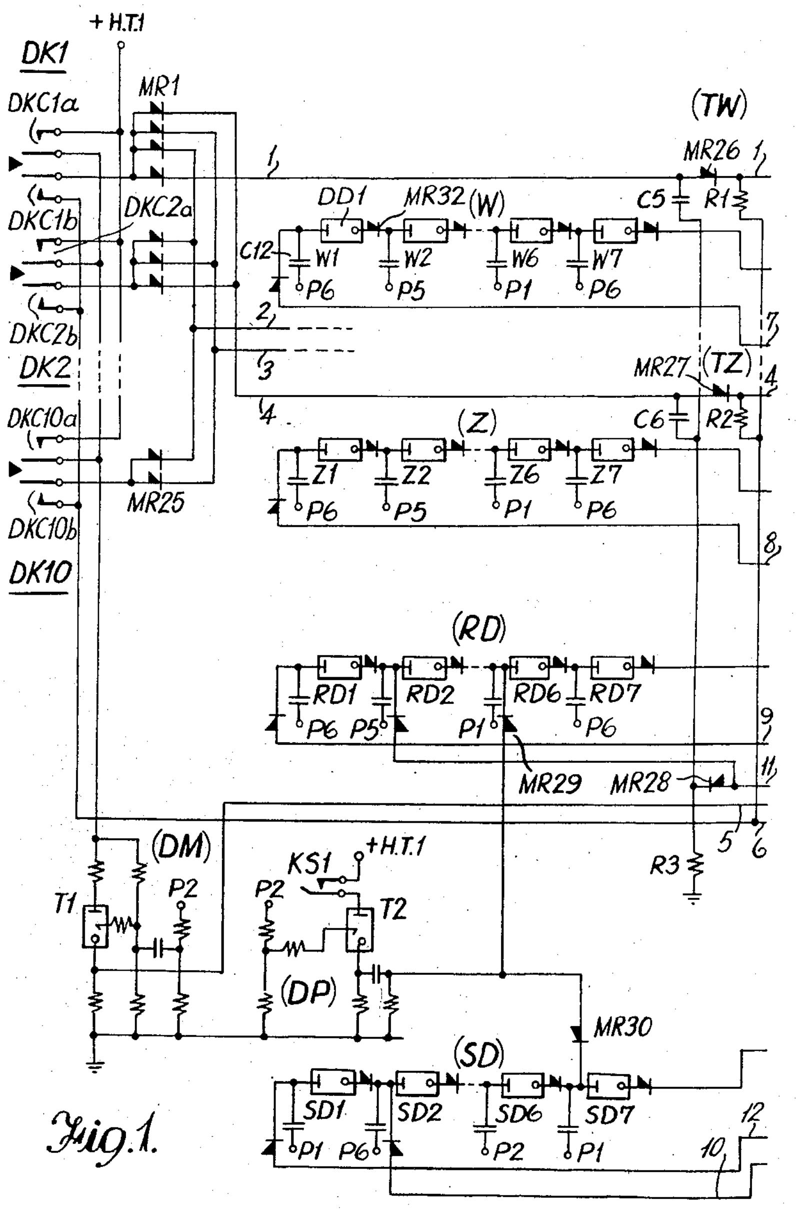

This invention relates to keysenders of the kind used in telephone systems. The function of a keysender in a telephone system is to receive and register digits keyed by an operator at a manual position in a telephone exchange for subsequent transmission and to transmit the registered digits as trains of impulses for the setting of automatic selecting switches. A keysender therefore comprises digit registers in which the keyed digits are stored, a receive distributor governing the entry of digits to the digit registers, a send distributor governing the extraction of digits from the digit registers, means for generating impulses at a predetermined rate, a sending counter for counting off trains of such impulses in accordance with markings applied to it by the digit registers, and means for repeating in suitable form over an outgoing impulsing circuit the trains of impulses so counted off. It is usual to transmit digits between an operator's digit keys and the digit registers in code form, and an arrangement hitherto commonly employed is for a key to mark one or a number of wires, usually not exceeding four, leading to the digit registers where the keyed digit is registered as a pattern of operated and unoperated storage devices.

In the present invention the digit registers and the receive and send distributors are all chain circuits, constituting dynamic stores, which operate on the reiterative principle in which a storage or control marking is caused to circulate in a chain of link elements until it is utilised. In general, in the case of each such chain circuit a marking inserted into the chain is caused to advance link by link until it reaches the end of the chain which may conveniently be referred to as the output end whereupon, if conditions for its utilisation do not then apply, the marking is transferred to the other end of the chain which may conveniently be referred to as the input end whence it is caused to progress along the chain to the output end whereupon, if conditions for its utilisation still do not apply, it is returned to the input end and is again progressed along the chain, and so on. Such chain circuits possess the advantages that they are reliable in operation, and are cheap to construct since each link element need only contain a few simple components.

A chain circuit may be arranged for a marking to be progressed along it in response to transfer pulses applied to the several link elements in turn, and one arrangement that may be employed is to utilise a number of cyclically generated pulses, each cycle including a number of pulses equally spaced in time, the several pulses of a cycle being fed to different link elements in the chain. If the pulses be, for convenience, designated P1, P2 and and so on, pulse P1 occurring earlier in the cycle than P2 and pulse P2 occurring earlier in the cycle than P3 and so on, the markings in a chain circuit may for example be progressed by applying the pulse P1 to the link element at the output end of the chain, the pulse P2 to the next link element and so on until the last pulse in the cycle is applied to the link element at the input end of the chain. The markings may be inserted at the input end of the chain or at an intermediate point, and there must be at least one more link element than there are markings to be accommodated, as the application of a pulse to a link element has the effect of transferring a marking in that link element to the next link element in the direction of the output end of the chain thereby leaving a vacant link element for the transference of a marking in the link element next behind it on the occurrence of the next pulse in the cycle.

The specific arrangement which has just been described requires in effect (since the pulses constituting a cycle have to be separated as regards their application to the link elements) as many pulse supplies as there are link elements in a chain. A smaller number of pulse supplies can be used by grouping the link elements of a chain circuit, and connecting corresponding link elements in the different groups to a common pulse supply line. In this case, the number of link elements must exceed the number of markings to be accommodated by at least the number of groups. For example, in the case where the link elements of a chain circuit comprising twelve link elements are divided into two groups, the chain being operated with six pulse supply lines, the chain circuit can accommodate not more than ten markings.

Chain circuits constituting dynamic stores, and suitable for use in carrying out the present invention, are described in my copending application, filed November 5, 1956, now U.S. Patent No. 2,798,983.

In a suitable type of chain circuit described in the said prior specification, each link element consists of a cold cathode diode, a rectifier, and a capacitor, the diode and rectifier being connected in series between a first terminal and a second terminal and the capacitor being connected between the first terminal and a pulse line to which a particular recurrent pulse in the recurrent cycle of pulses is fed and the capacitors in the several link elements being so connected to the different pulse lines that, in general and as regards each group of link elements, a link element later in the chain, i.e. towards the outgoing end of the chain, is connected to a pulse line fed with a pulse earlier in the cycle than the corresponding pulse fed to a link element earlier in the chain. In such a chain circuit, the link elements are connected in series with the second (or output) terminal of each link element in the chain except the last directly connected to the first (or input) terminal of the next link element ahead.

In the present invention, the connections of the pulse lines to the link elements of the receive distributor and to the link elements of the send distributor are, in effect, relatively displaced so that, and to the end that, the application of a transfer pulse to the last (output end) link element of the receive distributor occurs one pulse earlier in the pulse cycle than the application of a transfer pulse to the last (output end) link element of the send distributor. Transfer of markings from the last links of the two distributors therefore takes place at different times. The link elements in the digit register chains are aligned, as regards the pulse line connections, with those in the receive distributor chain, and accordingly markings from the last link elements in the digit register chains and the receive distributor chain are transferred simultaneously and by a pulse that is one pulse in advance of that fed to the corresponding link element of the send distributor chain.

A particular pulse in the recurrent pulse cycle is allocated for effecting the registration of a keyed digit and the duration of a cycle is short enough to ensure that the particular pulse will occur at least once while a key is depressed. As however the time of more than one cycle may elapse between the keying of a digit and the occurrence of the appropriate time period, as determined by the receive distributor, within which the keyed digit should be registered at the input end of the digit register chains, the arrangements of the invention provide for a temporary storage of the keyed digit during this time.

If, at the time the receive distributor marking is ready for transfer from the output link element, a digit has been keyed and stored within the temporary storage means, the circuits associated with the receive distributor for effecting the transfer are arranged to pass a signal to the temporary storage means to cause the stored digit to be released therefrom and passed to the input links of the appropriate digit register chains. At the same time, the marking in the receive distributor instead of being transferred to the input link is transferred to the link next ahead of it. Thereafter, the marking in the receive distributor continues to circulate one position in front of the markings in the digit register chains in readiness for the next digit to be keyed whereupon the above described operations are repeated.

The transfer of markings from the output end of the chains is dependent on gate circuits, and it is preferably arranged that a gate is prepared on the occurrence of a pulse immediately or closely following in the cycle the recurrent pulse utilised for opening the gate. This arrangement results in a manner of operation in which a gate is prepared for example by the second pulse in a cycle and operated by the subsequent first pulse of the succeeding cycle, thereby giving time for the several potentials to reach steady values.

The shift of the receive distributor marking effected by the transfer action already described alters the relative positions of control markings in the send and receive distributor chains and as a result of this, and providing no impulses are being counted or intertrain pause period is being measured in respect of a previously keyed digit, the transfer circuits associated with the send distributor are primed so that when the send distributor marking is ready to be circulated, a signal is passed from the send distributor transfer circuits to prepare for the extraction from the digit registers of the digit occupying the position in the chain immediately behind that occupied by the marking in the send distributor chain, and to prepare for the counting and transmission of impulses corresponding to this digit. At the same time the marking in the send distributor, instead of being transferred to the input link is transferred to the link next ahead of it, so that the send distributor control marking is, in effect, shifted one position in a direction to catch up with that in the receive distributor.

Arrangements are also provided to prevent duplicate registrations of a keyed digit if a key is held depressed for a period of two or more corresponding pulses.

Figure 2:
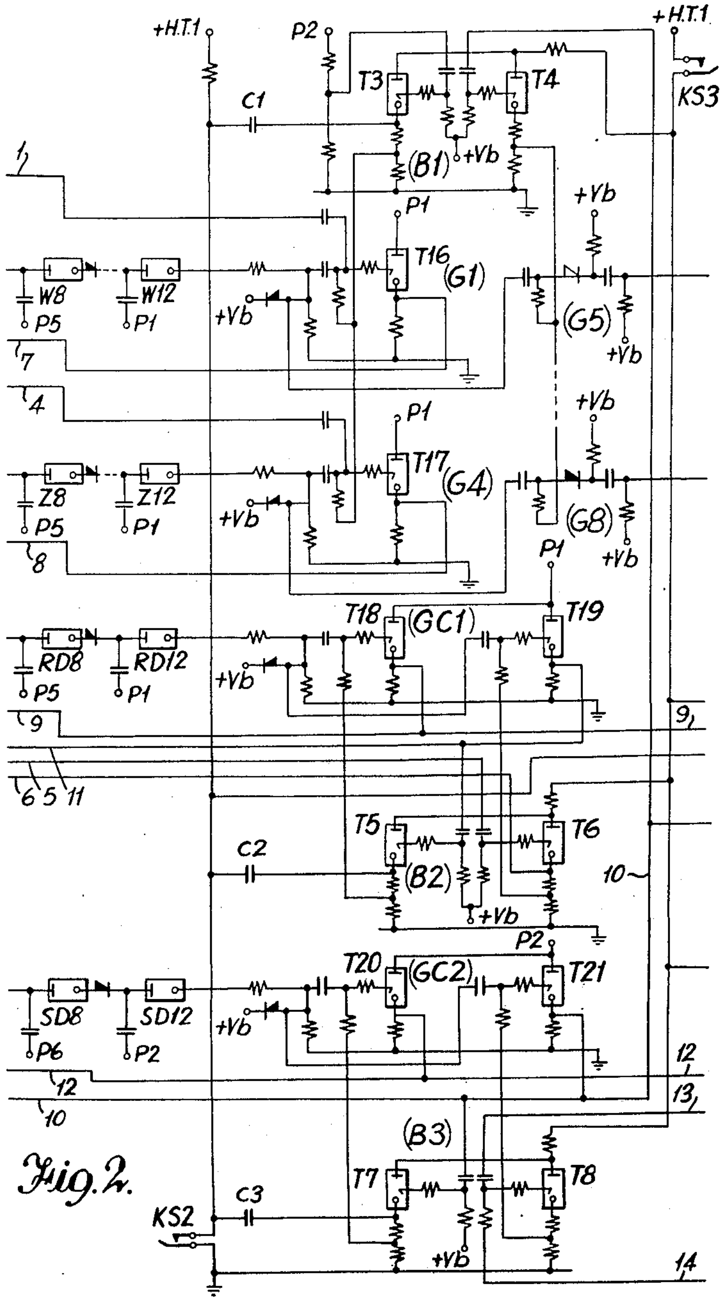
Figure 3:
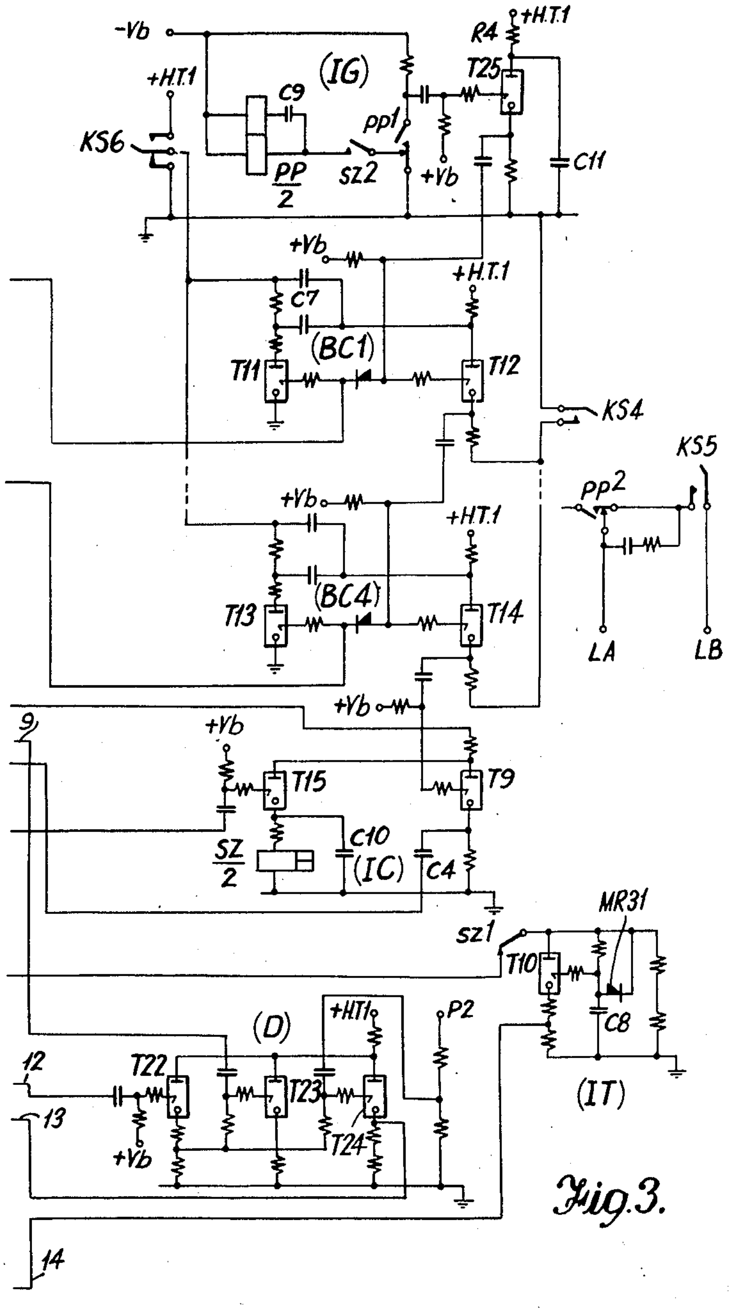

The features of the invention are exemplified in the specific circuit arrangements, constituting a keysender according to the invention, which will now be described with reference to the accompanying drawings. The figures of these drawings, comprising Figs. 1, 2, and 3, together constitute a circuit diagram of the key-sender, and should be viewed with Fig. 2 placed to the right of Fig. 1, and Fig. 3 placed to the right of Fig. 2. The circuit diagram includes the contacts of exemplary keys of a set of digit keys and the contacts of a start key, and the connections to these contacts. The keysender concerned includes four digit registers, a receive distributor governing the entry of digits to the digit registers, a send distributor governing the extraction of digits from the digit registers, an impulse generator for generating impulses at a specified rate, a sending counter for counting off trains of impulses in accordance with markings applied to it by the digit registers, and means for transmitting over an outgoing impulsing circuit the trains of impulses so counted off.

The set of digit keys referred to would in practice be located at a manual operating position, and would be provided in the form of a digit key strip. The set comprises ten digit keys, and each of these keys has two "make" contacts. Of the ten digit keys, only the first or "1" key DK1, the second or "2" key DK2, and the tenth or "0" key DK10 are shown by way of example in the circuit diagram (Fig. 1). The two "make" contacts belonging to key DK1 are designated DKC1*a* and DKC1*b*, the two belonging to key DK2 are designated DKC2*a* and DKC2*b*, and the two belonging to key DK10 are designated DKC10*a* and DKC10*b*. The start key referred to (hereinafter termed key KS) would also be located at the manual operating position, and has five "make" contacts KS1, KS2, KS3, KS4, and KS5, and a change-over contact KS6. In the circuit diagram, contact KS1 appears in Fig. 1, contacts KS2 and KS3 appear in Fig. 2, and contacts KS4, KS5, and KS6 appear in Fig. 3.

The four digit registers comprise one digit register for each element of a four-element code employed for the purposes of digit storage. Herein, the letters "W," "X," "Y," and "Z" will where convenient and appropriate be employed to signify both the four elements of the code and apparatus pertaining to the respective elements. Of the four digit registers, then, one is a "W" register, one is an "X" register, one is a "Y" register, and one is a "Z" register.

Each of the four digit registers and two distributors is in the form of a chain circuit having twelve link elements. The digit registers are not fully shown in the circuit diagram, but are represented by the first, second, sixth, seventh, eighth, and twelfth link elements W1, W2, W6, W7, W8, and W12 respectively of the "W" register, and by the corresponding link elements Z1, Z2, Z6, Z7, Z8, and Z12 of the "Z" register. The receive distributor and the send distributor, designated RD and SD respectively, are also not fully shown in the circuit diagram, but are represented by the first, second, sixth, seventh, eighth, and twelfth link elements RD1, RD2, RD6, RD7, RD8, and RD12 respectively of the receive distributor, and by the corresponding link elements SD1, SD2, SD6, SD7, SD8, and SD12 of the send distributor.

All the link elements of the four digit registers and two distributors are similar, and each consists of a cold cathode diode such as DD1 and a rectifier such as MR32 connected in series, in the order stated, between an input terminal and an output terminal, and a capacitor such as C12 connected between the input terminal and a pulse supply terminal. Each of the six chain circuits concerned is formed by connecting the requisite number (twelve) of link elements in series, with the output terminal of each link element in the chain except the last connected to the input terminal of the next link element ahead.

The keysender is supplied with cyclically generated positive pulses, each cycle of these pulses comprising a (so-called) "P1" pulse, a "P2" pulse, a "P3" pulse, a "P4" pulse, a "P5" pulse, and a "P6" pulse. The six pulses of a cycle occur in the order stated and are equally spaced in time. The pulses are generated at a rate of 600 pulses per second, so that the periodic time of the cycle is 10 milliseconds. The "P1" pulses are supplied to the keysender on a "P1" pulse line (not shown in the circuit diagram), the "P2" pulses are supplied to the keysender on a "P2" pulse line (not shown in the circuit diagram) and so on. All the terminals designated P1 in the circuit diagram are connected to the "P1" pulse line, all the terminals designated P2 are connected to the "P2" pulse line, and so on. For ease of description, each of the designations "P1" to "P6" will where convenient and appropriate be employed hereinafter to signify not only the relevant recurrent pulse and terminals to which this pulse is applied, but also the brief intervals of time during which the relevant recurrent pulse appears.

In the case of each of the six chain circuits which constitute the four digit registers and two distributors, each pulse line is connected to the pulse supply terminals of two link elements, these two link elements being spaced five (intervening) links apart (considering the chain as being closed). In the case of the four digit registers and the receive distributor RD, the pulse lines are connected so that the twelfth (output end) and sixth link elements have P1 pulses applied to their pulse supply terminals, the eleventh and fifth link elements have P2 pulses applied to their pulse supply terminals, the tenth and fourth link elements have P3 pulses applied to their pulse supply terminals, and so on, the first (input end) link element having P6 pulses applied to its pulse supply terminal. In the case of the send distributor SD, the connections of all the pulse lines are displaced one link element compared with the connections just quoted, this displacement being in the direction round the chain (considering the chain as closed) proceeding from the first element SD1 to the twelfth element SD12 via elements SD2 to SD8. Thus in the case of the send distributor the twelfth (output end) link element SD12 has P2 pulses supplied to its pulse supply terminal and the first link element SD1 has P1 pulses supplied to its pulse supply terminal. The pulses supplied to the pulse supply terminals of the six chain circuits now being referred to serve as transfer pulses in response to which storage markings inserted into a chain are progressed along the chain to provide an output at the output end of the chain. A storage marking is constituted by a significant charged condition of the capacitor (such as C12) of a link element, this condition being one in which the upper terminal (as seen in the circuit diagram) of the capacitor is substantially positive with respect to the lower terminal. Transfer of a storage marking from a link element involves the striking of the diode (such as DD1) of the link element. With the arrangements described, there must always be at least two vacant link elements (i.e. elements in the normal condition) in a chain circuit for storage markings to progress to, since each transfer pulse is applied to two spaced link elements of a chain circuit. The maximum number of storage markings each digit register or distributor can accommodate is therefore ten. Since a storage marking is transferred once per cycle of the P1 to P6 pulses, it takes a marking inserted at the input end of a chain circuit 120 milliseconds to completely traverse the chain.

Each of the four digit registers has individual to it a circulating gate and a sending gate. In the circuit diagram, only the circulating gate G1 and sending gate G5 which are associated with the "W" register, and the circulating gate G4 and sending gate G8 which are associated with the "Z" register, are shown. The circulating gates are opened to receive the output markings from the digit registers, and re-insert them in these registers at their input ends, when these markings are to remain stored and are not yet required for utilisation. The sending gates are opened, instead of the circulating gates, when the output markings from the digit registers are to be applied to the sending counter to mark it preparatory to sending. Such marking of the sending counter has the effect of priming it to a starting condition corresponding to the marking. Associated with the circulating and sending gates is a bi-stable trigger circuit B1. One output condition of this circuit prepares the circulating gates for through transmission, and its other output condition prepares the sending gates for through transmission.

Each of the four digit registers has individual to it a temporary digit store, the four temporary digit stores thus provided serving to register the digital information from the digit key strip prior to its insertion into the main digit registers. In the circuit diagram, only the temporary digit stores TW and TZ associated with the "W" and "Z" registers respectively are shown. Each temporary digit store comprises a capacitor such as C5 or C6, a rectifier such as MR26 or MR27 and a resistor such as R1 or R2. A resistor R3 is common to all of the temporary digit stores.

Two control circuits GC1 and GC2 are associated with the receive distributor RD and send distributor SD respectively. In the case of each of these control circuits, one output condition of the circuit effects the circulation of a control marking in the associated distributor. In the case of the control circuit GC1 the other output condition initiates a registering operation of the keysender, and in the case of the control circuit GC2 the other output condition initiates a sending operation of the keysender. Each of the control circuits includes two three-electrode cold cathode tubes (T18 and T19, T20 and T21) the anode voltage of which is furnished by the same pulses as produce the output markings from the associated distributor. Thus each of these control circuits is prepared for operation synchronously with the times at which the associated distributor can produce an output marking. Two bi-stable trigger circuits B2 and B3 are associated with the control circuits GC1 and GC2 respectively. In the case of each of these trigger circuits whether one or the other output condition obtains determines which of its two functions the associated control circuit is to perform.

The sending counter comprises a chain of four binary counting elements arranged to count on a strict binary scale basis, and having a natural count of sixteen. The four binary counting elements are not fully shown in the circuit diagram, but are represented by the first counting element BC1 in the chain and the fourth counting element BC4 in the chain. The binary counting elements are of known type comprising a pair of three-electrode cold cathode tubes (such as T11 and T12, and T13 and T14) arranged to be operated by the so-called "pulse-plus-bias" technique.

The impulse generator circuit, designated IG, includes an impulse generating relay PP and a three-electrode cold cathode tube T25. This tube serves as an output tube which operates to render any bouncing of contact *pp1* ineffective so far as the counting of the generated impulses by the sending counter is concerned. The two windings of relay PP are differentially connected as regards their energisation in parallel, so that when initially connected the relay does not operate until capacitor C9 becomes sufficiently charged to limit severely the current in the upper (as shown in the circuit diagram) winding of the relay. When the relay is disconnected, it does not immediately release because capacitor C9 drives current round the closed loop of the two windings in such a direction that both windings aid in holding the relay operated until the capacitor has discharged. The relay generates impulses (when contact *sz2* is closed) by self-interruption of its circuit at contact *pp1*. Each impulse generated with key contact KS5 closed is transmitted over an outgoing impulsing circuit connected to terminals LA and LB.

The keysender also includes an impulsing control circuit IC comprising a high-speed start relay SZ and two three-electrode cold cathode tubes T9 and T15 which tubes are connected to form a bi-stable trigger pair, a detection circuit D which comprises three three-electrode cold cathode tubes T22, T23, and T24 and serves to detect relative displacement of the control markings in the distributors to determine whether or not there is digital information for transmission stored in the digit registers, and an intertrain pause circuit IT comprising a three-electrode cold cathode tube T10. Associated with the two distributors is a distributor priming circuit DP which comprises a three-electrode cold cathode tube T2 and which upon the operation of the start key KS effects the insertion of control markings into the distributors. A digit marking circuit DM comprising a three-electrode cold cathode tube T1 serves to transmit a triggering signal to the bi-stable trigger circuit B2 when the receive distributor RD is required for use to control the insertion of digital information into the digit registers. The three electrode tubes in the various circuits just referred to are arranged to be operated by the so-called "pulse-plus-bias" technique.

The keysender is served by three supply voltages: a high tension voltage +HT1 provides the anode potential for the three-electrode cold cathode tubes, a bias voltage +V*b* in general provides the bias for the trigger electrodes of these tubes, where necessary, in accordance with the "pulse-plus-bias" technique, and a negative voltage −V*b* provides the potential for the operation of the impulse generating relay PP.

Digits are received into the keysender from the digit key strip in code form, the code consisting of four elements singly and in combination, the code for each digit being as shown below:

| | |
|---|---|
| 1—WXYZ | 6—XZ |
| 2—XYZ | 7—WZ |
| 3—WYZ | 8—Z |
| 4—YZ | 9—WXY |
| 5—WXZ | 10—XY |

This code is in a form according to the binary notation and as will be described in detail later the binary sending counter is primed according to the above code for a particular value of digit prior to its counting out: e.g. if a count of two from the sending counter is required for the digit "2," then the X, Y and Z marking which is the code for the digit "2" will cause the sending counter to be primed to a starting condition equivalent to a count of 14 so that after a count of two the sending counter will be counted out and restored to normal. Similarly, the W, Y and Z code marking representing the digit "3" will cause the sending counter to be primed to a starting condition equivalent to a count of 13 and so on.

Considering now the operation of the circuit, when the start key KS is operated its contacts prepared the key-sender prior to the receipt of the keyed digits. Contact KS1 applies the +HT1 voltage to the anode of tube T2 in the distributor priming circuit DP, contact KS2 applies a negative-going setting pulse via capacitors C1 to C4 to the cathodes of the tubes T3, T5, T7 and T9 in the bi-stable trigger circuits B1, B2, B3 and the impulsing control circuit IC respectively, which pulse is effective to set these circuits to their respective conditions in which the said tubes are conducting, contact KS3 applies the +HT1 voltage to the anodes of the tubes in the bi-stable trigger circuits B1, B2, B3 and the impulsing control circuit IC and the inter-train pause circuit IT, contact KS4 connects earth to the cathodes of the right-hand (as shown in the circuit diagram) or "0" tubes in each of the binary counting elements of the sending counter, contact KS5 prepares the impulsing out loop, and contact KS6 removes earth from, and applies the +HT1 voltage to, the anodes of the left-hand (as shown in the circuit diagram) tubes of the binary counting elements of the sending counter and in addition applies a +HT1 voltage pulse through capacitors such as C7 in each of the binary counting elements to cause the right-hand or "0" tube of each binary counting element to become conductive.

During the period of the first P2 pulse after the operation of the start key KS, the tube T2 in the distributor priming circuit DP is fired and the output signal produced at its cathode inserts a control marking into the sixth link element RD6 of the receive distributor RD and into the seventh link element SD7 of the send distributor SD by way of rectifiers MR29 and MR30. These markings are progressed down the distributors during subsequent pulse cycles and each on reaching the relevant output link element is applied during the next succeeding pulse cycle to the relevant control circuit GC1 or GC2, and fires the tube T18 or T20 contained therein. Since the marking in the send distributor SD is one position (link element) in advance of the marking in the receive distributor RD, tube T20 will fire one pulse cycle before tube T18 at time P2. The output signal from the cathode of tube T20 is applied over wire 12 to re-insert a marking in the send distributor (at the input end thereof) and also to fire tube T22 in the detection circuit D. Similarly, when tube T18 fires during the next pulse cycle at time P1 the output signal from the cathode of this tube is applied over wire 9 to re-insert a marking in the receive distributor (at the input end thereof) and also to fire tube T23 in the detection circuit D which has previously been biased ready for operation by the firing of tube T22. The above operation of the control circuits GC1 and GC2 is consistently repeated so long as the digit registers are empty, the detection circuit detecting the relative displacement of the markings in the distributors by the alternate firing of its tubes T22 and T23 (the firing of either of these tubes extinguishing the other) and thus preventing its tube T24 from firing to produce an output signal from the detection circuit which, as will be described presently, initiates the sending operation of the keysender.

The inter-train pause circuit IT also commences its operation on the operation of the start key when the +HT1 voltage is applied to it. When capacitor C8 has charged to the triggering potential of the tube T10, this tube fires and produces an output signal on wire 14, the time taken for the triggering potential of the tube to be reached being 500 milliseconds. Initially, this output condition persists since tube T10 cannot be extinguished and capacitor C8 cannot discharge until relay SZ operates, but once sending commences the relay SZ operates at the end of each count by the sending counter and the inter-train pause circuit functions normally to measure the inter-train pauses.

When a digit key is depressed the tube T1 in the digit marking gate DM has the +HT1 voltage applied to its anode through the (*a*) contact of the operated digit key. Since the minimum possible depression time for a digit key is in the order of 150 milliseconds a P2 pulse occurs whilst the +HT1 voltage is applied to the anode of tube T1 so that this tube is fired and an output signal is produced at its cathode. This signal is applied over wire 5 to the bi-stable trigger circuit B2 associated with the receive distributor RD and is effective to change the condition of this trigger circuit so that tube T6 is conducting and tube T5 is extinguished. Two output signals are produced from the cathode of tube T6: one is applied over wire 6 and through the (*b*) contact of the depressed digit key and one, two, three, or four associated isolating rectifiers such as MR1 and MR25 to charge the capacitors such as C5 and C6 in the relevant temporary stores such as TW and TZ according to the value of the digit; these capacitors can charge since the signal on wire 6 is also applied via the resistors such as R1 and R2 in each of the temporary stores thereby backing-off rectifiers such as MR26 and MR27; the other output signal is applied to the control circuit GC1 to bias it in readiness for operation of the tube T19 contained therein. Consequently, the next time the marking in the receive distributor RD is applied to the control circuit GC1 tube T19 is fired at time P1 instead of tube T18. The output signal from the cathode of tube T19 is applied over wire 11 to change the state of the bi-stable trigger circuit B2 so that tube T5 again becomes conductive and is also applied through rectifier MR28 to the capacitors such as C5 and C6 in the temporary stores so that (in general terms) those of these capacitors which are charged allow their associated rectifiers such as MR26 and MR27 to become conductive and produce a signal on wires such as wires 1 and 4 to fire the tubes such as T16 and T17 in the relevant circulating gates such as G1, and G4, the resulting output signals from which insert a marking at the input ends of the associated digit registers. The output signal on lead 11 also re-inserts a control marking into the receive distributor but one position (link element) ahead of the markings inserted into the digit registers and in the same position as the marking in the send distributor. To repeat the above digit marking procedure the digit key initially depressed must be restored and then it or another digit key has to be depressed, since only in this way can tube T1 in the digit marking circuit DM operate to produce a further output signal to change the state of the bi-stable trigger circuit B2. Since the control marking re-inserted into the receive distributor is one position (link element) in advance of those in the digit registers, subsequent digit markings for storage can be inserted into the digit registers in the manner just described since there is always a vacant link element at the input end of each digit register when a marking is applied to control circuit GC1 until such time as the digit registers are full i.e. ten digit markings have been stored therein. Each time a digit marking is inserted into the digit registers the control marking in the receive distributor RD is re-inserted one position (link element) in advance of the last digit marking stored so that the keysender is always ready to receive the next digit for registration. Until the digit markings are required for utilisation they will be circulated by the relevant circulating gates such as G1 and G4.

After the first digit markings are inserted into the digit registers, the relative displacement of the control markings in the distributors is changed; i.e. the control marking in the receive distributor RD is advanced so as to appear at the output end of the receive distributor in at least the same pulse cycle as the control marking in the send distributor SD appears at the output end of the send distributor. Consequently, the next time an output signal on wire 12 fires tube T22 in the detection circuit D, tube T23 is not fired before the P2 pulse of the next pulse cycle and so tube T24 is fired instead. The output signal from the cathode of tube T24 is applied over wire 13 to change the state of the bi-stable trigger circuit B3 so that tube T8 is conducting and tube T7 is cut-off, this output signal, however, only being effective if the inter-train pause circuit IT is providing an output signal on wire 14 to bias tube T8 in readiness for operation. The output signal from the cathode of tube T8, when this tube is fired, prepares for operation the tube T21 in the control circuit GC2 associated with the send distributor SD so that the next time this distributor gives an output marking tube T21 is fired at time P2 instead of tube T20. The output signal from the cathode of tube T21 is applied over wire 10 to perform four functions: it fires tube T7 in the bi-stable trigger circuit B3 to change this circuit back into its initial condition; it fires tube T15 in the impulse control circuit IC so that start relay SZ is operated to start the impulse generator circuit IG by the closing of contact *sz*2; it fires tube T4 in the bi-stable trigger circuit B1 to change the output condition of this circuit; and it re-inserts a control marking into the send distributor one position (link circuit) in advance of the normal circulatory re-insertion. It is to be appreciated that the markings in the digit registers representing the first digit initially keyed in are situated one position behind the particular control marking in the send distributor that has brought about the firing of the tube T21 as just stated. Consequently, at time P1 in the next pulse cycle after the functions just referred to have been effected, the output markings from the relevant digit registers are applied to their associated circulating and sending gates. Owing to the output condition of the bi-stable circuit B1 the circulating gates such as G1 and G4 are closed and the sending gates such as G5 and G8 are open; therefore the relevant ones of these sending gates produce output signals which prime the sending counter in the manner already described.

The impulse generating relay PP in the impulse generator circuit IG impulses at 10 impulses per second in the well known manner upon the closing of contact *sz*2, and each time it operates, contact *pp*1 causes tube T25 to fire to transmit a stepping pulse to the sending counter while contact *pp*2 sends a break impulse over the outgoing impulsing circuit. The tube T25 is made self-extinguishing by the action of resistor R4 and capacitor C11. The last count of the sending counter, i.e. the counting of the impulse bringing it to the binary setting "0000," fires tube T9 in the impulsing control circuit IC so that tube T15 therein is extinguished and relay SZ is released. On relay SZ releasing, contact *sz*2 stops the impulse generator circuit and contact *sz*1 re-applies the +HT1 voltage to the intertrain pause circuit IT which again functions and after a period of 500 milliseconds again applies an output signal to the wire 14. The make to break ratio of the impulses transmitted over the outgoing impulsing circuit is 1:2.

It will be remembered that the control marking in the send distributor was re-inserted therein one position in advance of the normal circulatory re-insertion. This means in effect that it is now circulating one position in advance of the markings (in the digit registers) representing the second digit keyed in. Consequently when the detection circuit D again detects that the receive and send distributor control markings are displaced in the manner already described to indicate that the digit registers still contain digit markings, and the inter-train pause circuit is giving an output signal, the sending operation just described is repeated. This continues until all the markings in the digit registers have been utilised, by which time the control marking in the send distributor has again assumed its initial position therein, relative to the control marking in the receive distributor, such that it is again one position in advance of the marking in the receive distributor and therefore further sending is prevented since the detection circuit is rendered inoperative due to the relative displacement of these distributor control markings as previously mentionoed.

The keysender may be released at any time by the restoration of the start key KS. If there are still markings in the digit registers when this key is restored they will be progressed to the output links by the P pulses but will not be re-inserted since the circulating gates are closed in the absence of bias from their associated bi-stable trigger circuits. Similarly, the control marking in each of the distributors will be progressed to the output link but will not be re-inserted.

In a contemplated modification of the keysender which has been described, the impulse generating relay previously referred to is dispensed with and instead the impulses sent to line are derived from the 600 pulses per second master pulse supply. This may be done by means of a separate counting chain circuit operated from the master pulse supply with a rotation time of 120 milliseconds as for the distributors and digit registers. In this case markings spaced by a number of links, say four to give an impulsing make to break ratio of 1:2 would be caused to rotate in this chain and the transfer path for the chain would include impulse repeating means, e.g. a circulating gate and an impulse repeating relay, arranged to be operated by the first marking and released by the second each time the pulses are transferred from the output to the input links of the chain. In a preferred arrangement, the need for a separate ring counter is avoided by arranging that the send distributor chain serves both for controlling the impulse repeating means as well as for its normal distribution function. This may be done by inserting two suitably spaced markings into this chain as described above for the separate counting chain and by arranging that the impulse repeating relay, when operated, disconnects the distributor output path to the register and counting control circuits and when released completes this path. By this means it may be arranged that only one of the markings inserted into the send distributor chain is effective as a send distributor marking.

What I claim is:

1. A multi-digit register sender of the kind used in telephone systems, including a plurality of signalling wires on which digits keyed by an operator for registration in, and subsequent sending by, the register sender appear as signals in multi-element code form there being one such wire for and individual to each element of the multi-element code employed, a set of digit storage chains comprising one storage chain for and individual to each element of the multi-element code and operative as a whole for storing keyed digits appearing as said signals on said signalling wires and a first auxiliary storage chain for governing the insertion of such digits into said set of digit storage chains for storage therein and a second auxiliary storage chain for governing the extraction of stored digits from said set of digit storage chains, each said storage chain consisting of a number, the same for all of the chains, of serially connected storage elements each adapted to store a storage marking inserted into the chain, for each said storage chain means for effecting repeated circulation of an inserted storage marking along the chain by transfer from storage element to storage element in accordance with a recurrent circulating cycle, means for inserting a storage marking, constituting a distribution control marking, into said first auxiliary storage chain and a storage marking, also constituting a distribution control marking, into said second auxiliary storage chain preparatory to the insertion of keyed digits into said set of digit storage chains for storage, means controlled by the distribution control marking in said first auxiliary storage chain during its circulation in the chain for causing a keyed digit appearing as a signal in multi-element code form on said signalling wires to be inserted into said set of digit storage chains by the insertion of a storage marking into each relevant one, as determined by the signal, of these storage chains, means for effecting, in respect of each such insertion of a keyed digit, a change of the position of the distribution control marking in said first auxiliary storage chain in the recurrent circulating cycle and thereby causing the digits constituting a plurality of keyed digits inserted into said set of digit storage chains for storage to be properly separated in and stored in proper order in the chains, a utilisation circuit, impulse sending and counting means for sending a number of impulses over said utilisation circuit in accordance with a setting imparted to this means by the transfer thereto from said set of digit storage chains of each storage marking pertaining to a stored digit, means controlled by the distribution control marking in said second auxiliary storage chain during its circulation in the chain for causing each storage marking pertaining to a stored digit to be extracted from said set of digit storage chains and transferred to said impulse sending and counting means for the setting thereof, and means for effecting, in respect of each such extraction of a stored digit, a change of the position of the distribution control marking in said second auxiliary storage chain in the recurrent circulating cycle and thereby causing keyed digits stored in said set of digit storage chains to be extracted therefrom in proper order.

2. A multi-digit register sender of the kind used in telephone systems, including a plurality of signalling wires on which digits keyed by an operator for registration in, and subsequent sending by, the register sender appear as signals in multi-element code form there being one such wire for and individual to each element of the multi-element code employed, a set of digit storage chains comprising one storage chain for and individual to each element of the multi-element code and operative as a whole for storing keyed digits appearing as said signals on said signalling wires and a first auxiliary storage chain for governing the insertion of such digits into said set of digit storage chains for storage therein and a second auxiliary storage chain for governing the extraction of stored digits from said set of digit storage chains, each said storage chain having an input end and an output end and consisting of a number, the same for all of the chains, of serially connected storage elements each adapted to store a storage marking inserted into the chain, a plurality of pulse supply lines for supplying to each said storage chain transfer pulses in accordance with a recurrent pulse cycle for effecting circulation of an inserted storage marking along the chain by transfer from storage element to storage element, for each said storage chain means for transferring a storage marking from the last to the first storage element in the chain to provide for repeated circulation of an inserted storage marking along the chain in accordance with a recurrent circulating cycle, means for inserting a storage marking, constituting a distribution control marking, into said first auxiliary storage chain and a storage marking, also constituting a distribution control marking, into said second auxiliary storage chain preparatory to the insertion of keyed digits into said set of digit storage chains for storage, means prepared for operation upon the keying of a digit, and operative upon the next succeeding transfer of the distribution control marking in said first auxiliary storage chain from the last storage element in the chain, for causing this transfer to be to the second instead of to the first storage element in the chain and means for at the same time causing the keyed digit to be inserted into said set of digit storage chains by the insertion of a storage marking into each relevant one, as determined by the signal in multi-element code form on said signalling wires, of these storage chains at the input end thereof, such transfer of the distribution control marking in said first auxiliary storage chain to the second instead of to the first storage element in the chain serving to advance the marking one position in the recurrent circulating cycle and thereby serving to cause keyed digits inserted into said set of digit storage chains for storage to be properly separated in and stored in proper order in the chains, a utilisation circuit, impulse sending and counting means for sending a number of impulses over said utilisation circuit in accordance with a setting imparted to this means by the transfer thereto from said set of digit storage chains of each storage marking pertaining to a stored digit, and means operative upon a transfer, occurring whilst said set of digit storage chains have a digit stored therein and said impulse sending and counting means is awaiting setting preparatory to sending, of the distribution control marking in said second auxiliary storage chain from the last storage element in the chain, for causing this transfer to be to the second instead of to the first storage element in the chain and means for causing the next succeeding transfer of each storage marking pertaining to a stored digit from the last storage element of each relevant digit storage chain to be to said impulse sending and counting means for the setting thereof instead of to the first storage element in the chain, such transfer of the distribution control marking in said second auxiliary storage chain to the second instead of to the first storage element in the chain serving to advance the marking one position in the recurrent circulating cycle and thereby serving to cause keyed digits stored in said set of digit storage chains to be extracted therefrom in proper order.

3. A multi-digit register sender as claimed in claim 2 including means for the temporary storage of a keyed digit pending the occurrence of the appropriate time, determined by the time of transfer of the distribution control marking in said first auxiliary storage chain from the last storage element in the chain, for the insertion of the digit into said set of digit storage chains.

4. A multi-digit register sender as claimed in claim 2 in which each storage element in each storage chain is connected to one, depending on the storage element, of said plurality of pulse supply lines, and in which the connections of said pulse supply lines to the storage elements of said first auxiliary storage chain and to the storage elements of said second auxiliary storage chain are relatively displaced to cause transfer of storage markings from the last storage elements of these two chains to take place at different times in the recurrent pulse cycle.

5. A multi-digit register sender as claimed in claim 2 including means responsive to relative displacement of the distribution control markings in said first and second auxiliary storage chains in the recurrent circulating cycle for determining whether there is a digit stored in said set of digit storage chains and awaiting extraction.

References Cited in the file of this patent

UNITED STATES PATENTS

| | | |
|---|---|---|
| 2,638,506 | Bray et al. | May 12, 1953 |
| 2,730,568 | Reagan | Jan. 10, 1956 |
| 2,740,003 | Newb | Mar. 27, 1956 |
| 2,764,634 | Brooks et al. | Sept. 25, 1956 |
| 2,767,248 | Warman | Oct. 16, 1956 |